United States Patent
Chung et al.

(10) Patent No.: US 12,072,189 B2
(45) Date of Patent: Aug. 27, 2024

(54) PHOTOELECTRIC SENSING SYSTEM AND FEEDBACK MODULE

(71) Applicant: NATIONAL CENTRAL UNIVERSITY, Taoyuan (TW)

(72) Inventors: Hung-Pin Chung, Kaohsiung (TW); Bor-Wen Shiau, New Taipei (TW); Sheng-Han Chang, Chiayi (TW); Chii-Chang Chen, Taoyuan (TW); Yen-Hung Chen, Taoyuan (TW); Jann-Yenq Liu, Taipei (TW)

(73) Assignee: AEGIVERSE Co., Ltd., Taoyuan (TW)

( * ) Notice: Subject to any disclaimer, the term of this patent is extended or adjusted under 35 U.S.C. 154(b) by 206 days.

(21) Appl. No.: 17/818,570

(22) Filed: Aug. 9, 2022

(65) Prior Publication Data

US 2023/0408258 A1    Dec. 21, 2023

(30) Foreign Application Priority Data

May 30, 2022  (TW) .................................. 111120084

(51) Int. Cl.
   *G01J 1/44*       (2006.01)
   *G01C 19/72*   (2006.01)

(52) U.S. Cl.
   CPC .............. *G01C 19/726* (2013.01); *G01J 1/44* (2013.01)

(58) Field of Classification Search
   CPC ............ H01S 3/083; B81B 2201/0242; G01C 25/005
   See application file for complete search history.

(56) References Cited

U.S. PATENT DOCUMENTS

| 4,869,582 A | 9/1989 | Bergh |
| 5,278,631 A * | 1/1994 | Hollinger ............. G01C 19/726 356/464 |

(Continued)

FOREIGN PATENT DOCUMENTS

| DE | 0288032 A2 * | 10/1988 | ........... G01C 19/728 |
| EP | 1835258 A2 | 9/2007 | |

OTHER PUBLICATIONS

Xuan She, Tengchao Huang, and Xiaowu Shu, "Temperature modeling of modulation phase error in the integrated optical chip for closed-loop interferometric fiber optic gyroscope", 2019 SPIE (Year: 2019).*

(Continued)

*Primary Examiner* — Maurice C Smith
(74) *Attorney, Agent, or Firm* — Rosenberg, Klein & Lee (57) ABSTRACT

A feedback module is formed with modules comprising a schedule hardware register module and a computation circuit module. The schedule hardware register module receives a modulation signal and a sensing signal, and schedules and temporarily stores signal values of the sensing signal in successive half modulation cycles in sequence by taking a half modulation cycle as a time interval to obtain a temporarily stored sensing signal which has been scheduled. In each half modulation cycle, the computation circuit module calculates a differential signal value of the temporarily stored sensing signal between the previous two half modulation cycles, and outputs the differential signal value as a signal value of the feedback signal. The schedule hardware register module temporarily stores the feedback signal, and the feedback module feedbacks the feedback signal to an integrated optics chip of the photoelectric sensing system integrated optics chip.

13 Claims, 6 Drawing Sheets

(56) References Cited

U.S. PATENT DOCUMENTS

| | | | |
|---|---|---|---|
| 5,999,260 A * | 12/1999 | Tazartes | G01C 19/726 356/464 |
| 6,028,668 A | 2/2000 | Rider | |
| 6,473,182 B1 | 10/2002 | Tazartes et al. | |
| 10,274,319 B2 | 4/2019 | Wang | |

OTHER PUBLICATIONS

Office Action with appended search report for the corresponding Taiwanese Application No. 111120084 issued on Oct. 31, 2022.

* cited by examiner

PHOTOELECTRIC SENSING SYSTEM AND FEEDBACK MODULE

TECHNICAL FIELD

The present disclosure relates to a feedback module used in a photoelectric sensing system, and particularly to a feedback module which utilizes logic circuits for achieving high efficiency feedback, and a photoelectric sensing system and at least one application, which are realized by the above feedback module.

RELATED ART

Conventional photoelectric sensing systems, particularly interferometric photoelectric sensing systems, such as interferometric fiber optic gyroscopes, often causes accumulated errors to occur in a signal phase modulation process due to accumulated optical phase errors on two interference paths. To compensate for such accumulated errors, in the issued U.S. Pat. No. 4,869,592, the phase modulation feedback signal of the triangle wave is transmitted to the phase modulator of the photoelectric sensing system, and the phase modulator uses the phase modulation feedback signal of the triangle wave to continuously obtain a cumulative phase signal. Based on the cumulative phase signal and a positive and negative inversion voltage signal of a fixed period, the phase modulator can simultaneously acquire a step signal. This step signal has a step wave height, and the step wave height is related to the phase difference acquired from the interferometer signal to be measured. By accumulating phases through the sawtooth wave between the ranges of $[-\pi, +\pi]$, the phase modulator is reset within the range of $[-\pi, +\pi]$ to lock the phase response signal in the linear operating range for the purpose of phase modulation and demodulation of closed-loop feedback.

Based on the above basic working concept, if the reset time point that occurs in the phase accumulation reset area cannot perfectly match the phase shift caused by the external interference signal, when the phase is reset, the phase overflow of the excessive phase compensation or the phase underflow of the insufficient phase compensation will occur. These phase compensation failure phenomena will cause the phase reset point of the photoelectric sensing system to be abnormal, making the closed-loop operation fail, and may even lead to the closed-loop operating point accidentally locked in the wrong operating range, so that the output signal of the overall fiber optic sensor has no reference value.

In view of the above phase overflow and phase underflow phenomena, the issued U.S. Pat. No. 5,278,631 discloses an improved closed-loop signal control process. The reset judgment equation is imported into the logic system to determine whether the signal of the system is in the tolerance range of phase error, and then the feedback signal of the operated step wave is processed accordingly. In practice, due to the introduction of the reset judgment equation and the redundant registers, the overall demodulation logic needs to execute a complicated operation process, and several half modulation cycles (p.s. the variable t is used to represent the half modulation cycle) must be accumulated before feedback is performed. In other words, only after the feedback time consumes several half modulation cycles $x*\tau$ (x is an integer larger than or equal to 2), the system can feedback the phase difference accumulated in the past several half modulation cycles $x*\tau$. Therefore, by adding a complicated discriminative process, although the phase overflow or phase overflow phenomenon can be reduced or avoided, it leads to a long phase feedback response time, which makes the closed-loop system work longer to achieve feedback stability.

Figure 1:
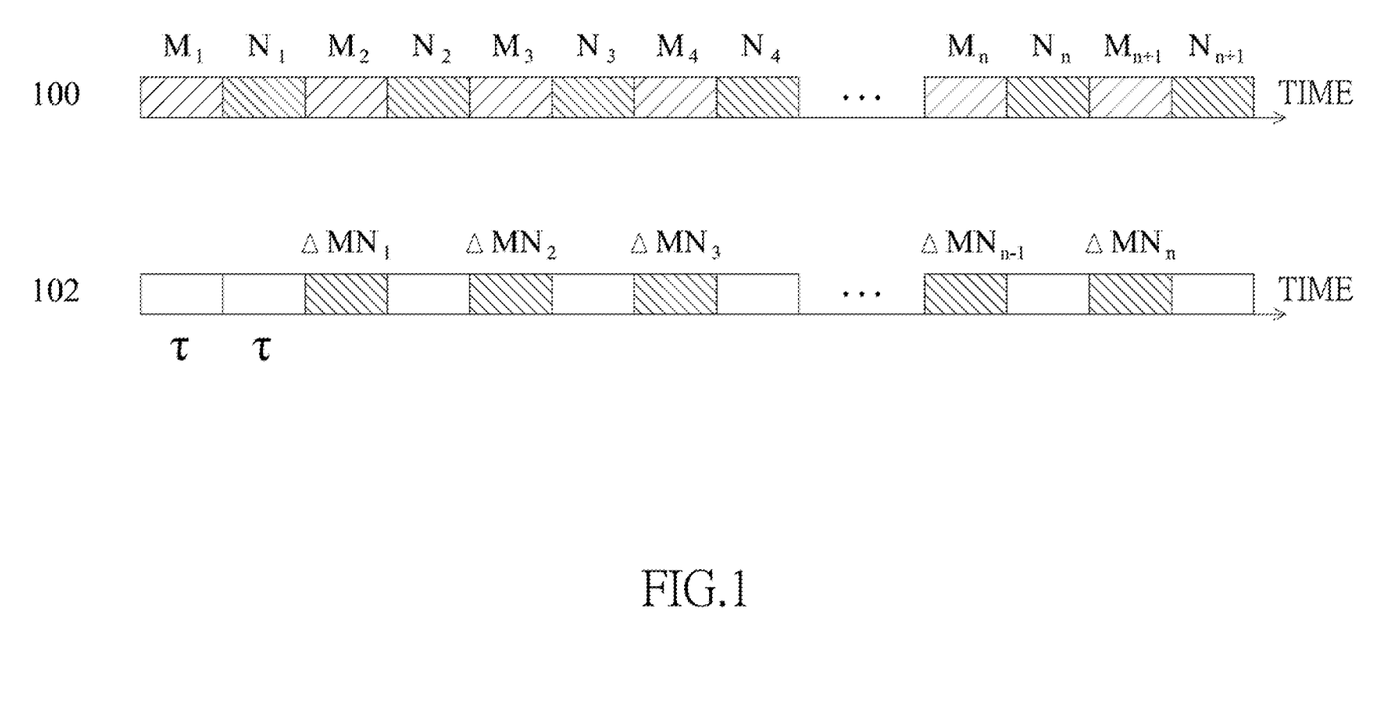
FIG. 1 is a timing diagram of multiple signals under a conventional closed-loop signal control process.

Refer to FIG. 1, and FIG. 1 is a timing diagram of multiple signals under a conventional closed-loop signal control process. The periodic positive and negative modulation voltage signal 100 is mainly composed of periodic positive and negative modulation voltages, and its half modulation cycle is expressed in the variable $\tau$, the signal values of the periodic positive and negative modulation voltage Signal 100 in time sequence of the horizontal axis is $M_1$, $N_1$, $M_2$, $N_2$, ..., $M_n$, $N_n$, $M_{n+1}$, $N_{n+1}$, wherein n is an integer greater than 1. In other words, in the $i^{th}$ modulation cycle, the signal values of the front half modulation cycle and the back half modulation cycle of the periodic positive and negative modulation voltage signal 100 are $M_i$ and $N_i$, respectively. In the first modulation cycle (i.e., the first two half modulation cycles $2*\tau$), the signal values $M_i$ and $N_i$ of the periodic positive and negative modulation voltage signal 100 are not obtained, and thus the discontinuous demodulation signal 102 in the first two half modulation cycles $2*\tau$ is marked by spaces. In the front half modulation cycle (i.e., $3*\tau$) of the second modulation cycle, the error (i.e., $N_1-M_1$) of the periodic positive and negative modulation voltage signal 100 is acquired as the signal value $\Delta MN_1$ of the discontinuous demodulation signal 102, the signal value $\Delta MN_1$ is output as the feedback signal for determining whether a phase modulator needs to be reset or not. The discontinuous demodulation signal 102 in the first two half modulation cycles $2*\tau$ is marked with spaces, but in fact it has accumulated error, so the output signal of the two half modulation cycles $2*\tau$ at the beginning may have no reference value. Similarly, in the front half modulation cycle (i.e., $(2i+1)*\tau$) of the $(i+1)^{th}$ modulation cycle, the signal value $\Delta MN_i$ of the discontinuous demodulation signal 102 is the error (i.e., $N_i-M_i$) of the periodic positive and negative modulation voltage signal 100 in the $i^{th}$ modulation cycle. As can be seen from FIG. 1, in addition to $\Delta MN_1$, every time $\Delta MN_i$ appears, it must be postponed by a half modulation cycle $\tau$, so it is equivalent to that the phase error is accumulated each modulation cycle, and the approach of FIG. 1 may make the feedback system experience the condition of phase overflow or phase underflow.

Traditionally, if the open-loop modulation and demodulation scheme is used, the sensitivity of the photoelectric sensing system will change with the variation of interference light intensity, and because the optical interference operating range cannot lock the sensing point in the optimal linear phase reaction region as the closed-loop operation scheme, such as the phase shift position of $[-\pi/2, +\pi/2]$, the output sensing signal has the poor linearity. Therefore, open-loop photoelectric sensing system typically has a small dynamic range, and the scale factor linearity is worse than that of closed-loop photoelectric sensing system.

To further simplify the problem of excessive response time caused by closed-loop workflows, the issued U.S. Pat. No. 6,028,668 re-selects the open-loop modulation and demodulation scheme. The issued U.S. Pat. No. 6,028,668 proposes a scheme that mainly introduces a digital phase tracker into the demodulation logic of the open-loop system, but since the output signal of the open-loop system is proportional to the sine and cosine waves, a nonlinear curve response of Bessel function will appear when demodulating. When it is required to output the signal as a linear signal, it is necessary to add a signal conversion unit, or add a calibration scheme, use a look-up table or use other scheme at the back-end, and the output signal of the open-loop photoelectric sensing system can become a sensing reference value with a high level of confidence.

Simply put, though the back-end calibration or the use of lookup table can be used to improve the poor linearity of the open-loop modulation and demodulation scheme, the manner increases the hardware cost. Compared with the use of open-loop modulation and demodulation scheme, the use of closed-loop modulation and demodulation scheme can simultaneously obtain the advantages of high linearity and high dynamic range. As a result, the industry is still mostly focused on how to build simplified closed-loop feedback systems to provide efficient feedback and reduce the feedback of the phase overflow or phase underflow.

On the other hand, the issued U.S. Pat. No. 6,473,182 B1 discloses a closed-loop feedback scheme with an automatic gain control. Based on a nonlinear control law, the proposed scheme uses an error estimation method to add a disturbance estimated mount (represented by a variable c) when calculating the feedback signal, and uses a gain control whose intensity can be adjusted to achieve a phase compensation feedback which a feedback signal in practice is increased or decreased by partial of the estimated mount, wherein the increase or decrease compensation comes from the intensity gain signal of the active modulation. Therefore, the active closed-loop feedback system can be achieved. The above scheme does partially solve the phase overflow and phase underflow phenomena associated with the phase reset, but because to search for stable closed-loop feedback system, additional variables of the disturbance estimated mount c are added, and the system feedback gain is also related to those variables. Thus, when the disturbance estimated mount e has a large degree of instability relative to the external environment, the closed-loop feedback system is bound to disintegrate, resulting in the inability to converge on the operating range of stable feedback, or a large back-and-forth oscillation phenomenon occurs. Accordingly, the output signal of the overall closed-loop photoelectric sensing system will have no reference value.

SUMMARY

To achieve at least one objective of the present disclosure, a feedback module used in a photoelectric sensing system comprising logic circuits and hardware circuits is provided. The logic circuits and the hardware circuits are electrically connected to each other to form a plurality of modules. The above modules comprise a schedule hardware register module and a computation circuit module. The schedule hardware register module is configured to receive a modulation signal in the photoelectric sensing system and a sensing signal in the photoelectric sensing system, schedule and temporarily store signal values of the sensing signal in successive half modulation cycles in sequence by taking the half modulation cycle as a time interval to obtain a temporarily stored sensing signal which has been scheduled. In each of the half modulation cycles, the computation circuit module calculates a differential signal value of the temporarily stored sensing signal between the previous two half modulation cycles, and outputs the differential signal value as a signal value of a feedback signal. The schedule hardware register module is further configured to temporarily store the feedback signal, and the feedback module feedbacks the feedback signal to an integrated optics chip of the photoelectric sensing system.

According to the above features of the feedback module, a manner for computing the differential signal value and scheduling the differential signal value is pre-recorded in the schedule hardware register module, such that the computation circuit module performs corresponding processes according to the pre-recorded manner for computing the differential signal value and scheduling the scheduling differential signal value.

According to the above features of the feedback module, the feedback module obtains the half modulation cycle from the modulation signal as a reference clock for accessing the schedule hardware register module.

According to the above features of the feedback module, the feedback module locks a shift work point of the integrated optics chip to an optimal efficiency work point after the half modulation cycle elapses.

To achieve at least one objective of the present disclosure, a photoelectric sensing system is provided. The photoelectric sensing system comprises the above feedback module, a light source module, the integrated optics chip, at least one optical sensor and a detector. The light source module is configured to provide a light source signal. The integrated optics chip is configured to receive the light source signal and at least one optical detection signal. The at least one optical sensor is configured to acquire at least one optical detection signal, wherein the integrated optics chip generates a light sensing signal according to the at least one optical detection signal. The detector is configured to perform a photoelectric conversion on the light sensing signal to generate the sensing signal.

According to the features of the photoelectric sensing system, the photoelectric sensing system further comprises a back-end circuit. The back-end circuit is configured to receive the sensing signal, and to perform a filtering process and a calibration process on the sensing signal to generate an output data representing a sensing result.

According to the features of the photoelectric sensing system, the feedback module is further configured to adjust a light source signal intensity, and the integrated optics chip is triggered by the light source signal.

According to the features of the photoelectric sensing system, the at least one optical sensor comprises two optical sensors, and the at least one optical detection signal comprises two optical detection signals.

According to the features of the photoelectric sensing system, the integrated optics chip comprises a phase modulator which is configured to modulate the light source signal according to the modulation signal to generate a modulated light source signal, wherein the integrated optics chip generates the light sensing signal according to the at least one optical detection signal and the modulated light source signal.

According to the features of the photoelectric sensing system, the integrated optics chip resets the phase modulator according to the feedback signal.

In summary, the proposed solution of the present disclosure is to add a hardware integrated circuit staging unit based upon a closed-loop photoelectric sensing system. According to a specially designed temporarily storing hardware chip scheme with scheduling function (i.e., using a schedule hardware register module), the change in light intensity generated by the modulation signal in each half modulation cycle is directly recorded by using the scheduling function, and by using the recording information of the previous half modulation cycle, the photoelectric sensing signal can be obtained at twice the sampling frequency superior to the prior art, so the data density can be more than doubled. Since the solution of present disclosure uses a schedule hardware register module, the software is not used in the computing unit, the computational energy consumption of the required field programmable logic gate array (FPGA) chip can be reduced at the same time. Compared with the pure digital logic of the prior art, the computing energy consumption using the solution of the present disclosure is expected to reduce the system computing power by about 17%.

BRIEF DESCRIPTION OF DRAWINGS

The present disclosure can be more fully understood by reading the subsequent detailed description and examples with references made to the accompanying drawings, wherein dimensions and arrangement configurations in the drawings are for illustration only, and the present disclosure is not limited thereto. Each figure of the drawings is briefly illustrated as follows.

DETAILS OF EXEMPLARY EMBODIMENTS

The following description is of the best-contemplated mode for realizing the present disclosure. This description is made for the purpose of illustrating the general principles of the present disclosure and should not be taken in a limiting sense. The scope of the present disclosure is best determined by reference to the appended claims.

To compensate for the shortcomings of the above schemes, in the present disclosure, the solution does not use the software or pure digital logic scheme which causes various technical problems, but directly deals with the source of error accumulation to decrease the error. The solution of the present disclosure further utilizes the high synchronization of the hardware chip scheduling scheme combined with closed-loop feedback logic to simultaneously solve the phase overflow and phase underflow phenomena. The solution of the present disclosure can reduce the error accumulation time to half modulation cycle t, compared with the prior art, the error accumulation time will be less than a time difference (p.s. from multiple half modulation cycles x*τ to a half modulation cycle t, and x is an integer larger than or equal to 2). Accordingly, the solution of the present disclosure is expected to create a highly efficient closed-loop feedback photoelectric sensing system.

Specifically, the proposed solution of the present disclosure is to add a hardware integrated circuit staging unit based upon a closed-loop photoelectric sensing system. According to a specially designed temporarily storing hardware chip scheme with scheduling function (i.e., using a schedule hardware register module), the change in light intensity generated by the modulation signal in each half modulation cycle is directly recorded by using the scheduling function, and by using the recording information of the previous half modulation cycle, the photoelectric sensing signal can be obtained at twice the sampling frequency superior to the prior art, so the data density can be more than doubled. Since the solution of present disclosure uses a schedule hardware register module, the software is not used in the computing unit, the computational energy consumption of the required field programmable logic gate array (FPGA) chip can be reduced at the same time. Compared with the pure digital logic of the prior art, the computing energy consumption using the solution of the present disclosure is expected to reduce the system computing power by about 17%.

Simply put, the photoelectric sensing system of the present disclosure is combined with a photoelectric sensing module with an efficient active feedback digital logic (consisting of a feedback module for processing electric signals and a photoelectric sensor for processing photoelectric signals), and the feedback module is particularly a highly efficient active sensing and feedback logic unit. The highly efficient active sensing and feedback logic unit utilizes the concept of digital logic and cooperates with the use of temporarily storing hardware integrated circuit chip technology to achieve active detection and feedback of photoelectric sensors and achieve the functional purpose of forming a high-efficiency photoelectric sensor computing unit.

Figure 2:
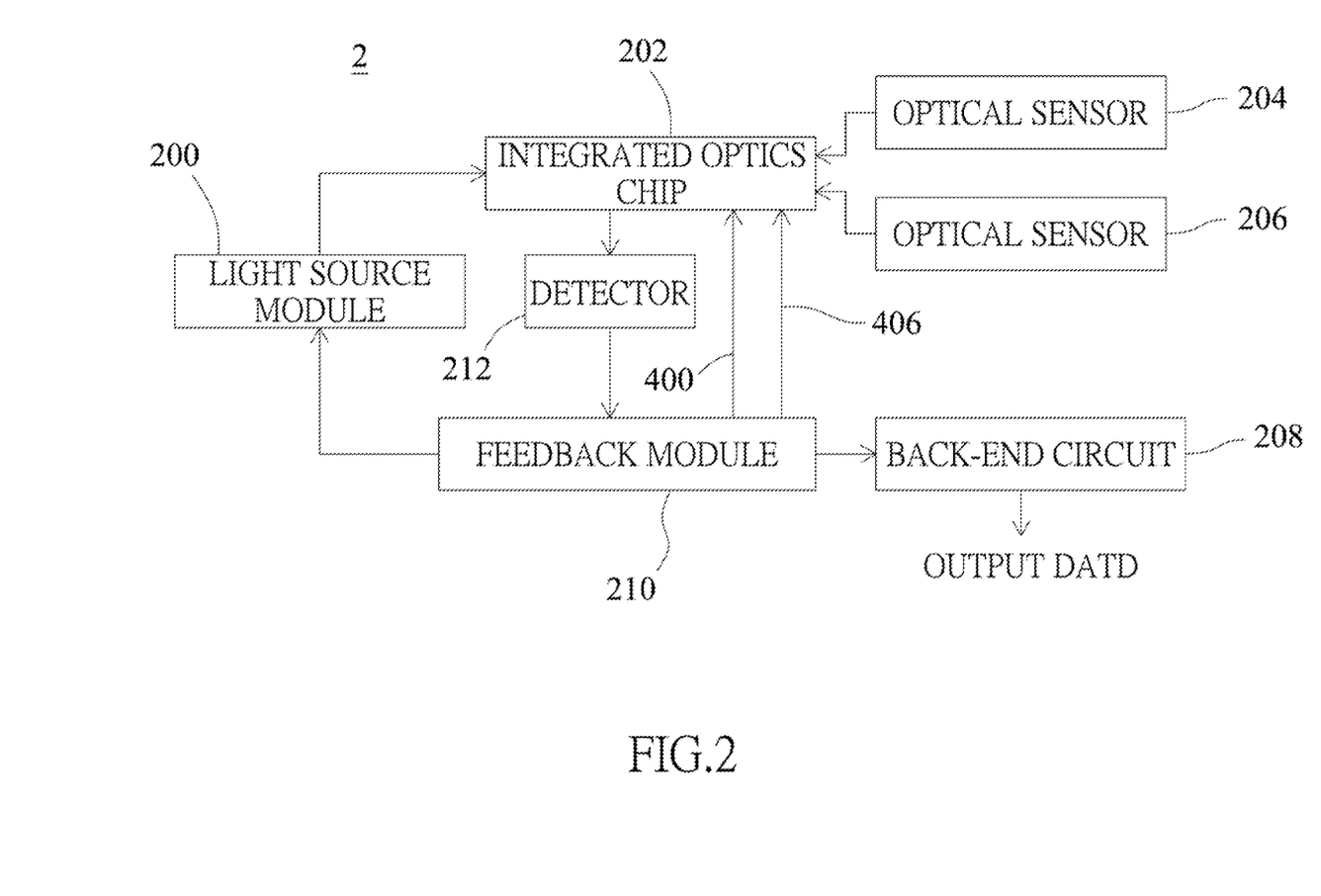
FIG. 2 is a block diagram of a photoelectric sensing system according to an embodiment of the present disclosure.

Firstly, refer to FIG. 2, and FIG. 2 is a block diagram of a photoelectric sensing system according to an embodiment of the present disclosure. The photoelectric sensing system 2 comprises a light source module 200, an integrated optics chip 202, optical sensors 204, 206, a back-end circuit 208, a feedback module 210 and a detector 212. The light source module 200 is signally connected to the integrated optics chip 202, the optical sensors 204 and 206 are signally connected to the integrated optics chip 202, and the feedback module 210 is signally connected to the integrated optics chip 202. The integrated optics chip 202 is signally connected to the detector 212, the detector 212 is signally connected to the feedback module 210, and the feedback module 210 is further signally connected to the back-end circuit 208.

The light source module 200 is used to provide the light source signal to the integrated optics chip 202, and according to actual requirements, the light source module 200 can be a light-emitting diode, a solid-state laser, a semiconductor laser or other types of light sources, thereby providing the light source signal with the required wavelength and bandwidth. The manner that the light source module 200 is signally connected to the integrated optics chip 202 can be realized by, for example, a single-mode optical fiber, a multi-mode optical fiber or a micro-lens, and the present disclosure is not limited thereto.

The integrated optics chip 202 is used for modulating the light source signal (such as but not limited to phase modulation) provided by the light source module 20 and receiving the optical detection signal obtained by the optical sensors 204 and 206, so as to realize corresponding sensing. The optical sensors 204, 206 are, for example, but not limited to, fiber rings, fiber gratings, or other types of optical sensing elements, and the types of the optical sensors 204, 206 are not intended to limit the present disclosure. The manner that the integrated optics chip 202 is signally connected to the optical sensors 204 and 206 can be realized by, for example, a single-mode optical fiber, a multi-mode optical fiber or a micro-lens, and the present disclosure is not limited thereto. In the present disclosure, after the integrated optics chip 202 modulates the light source signal provided by the light source module 200, a modulated light source signal is generated. Further, the modulated light source signal can be used as a reference signal for sensing, and the optical detection signals obtained by the optical sensors 204 and 206 are also sent to the integrated optics chip 202, so that the integrated optics chip 202 can obtain relevant sensing results.

In an embodiment of the present disclosure, the integrated optics chip 202 can be triggered according to the light source signal, and the light intensity of the light source signal emitted by the light source module 200 can be controlled by a light intensity control signal transmitted by the feedback module 210. Further, in addition to make the integrated optics chip 202 be triggered and turned on by the feedback module 210, it is also possible to make the light source signal received by the integrated optics chip 202 have stable light intensity after the integrated optics chip 202 is triggered and turned on. The manner that the feedback module 210 is signally connected to the light source module 200 can be realized by wires or other electrical connection manner.

A modulation signal 400 corresponding to the modulation light source signal is provided by the feedback module 210, and the modulation of the light source signal is performed by the integrated optics chip 202 which uses the modulation signal 400 to modulate the light source signal, for example, the modulation can be the phase modulation, and the present disclosure is not limited thereto. The integrated optics chip 202 generates a light sensing signal according to the optical detection signals obtained by the optical sensors 204 and 206 and the modulated light source signal, and the light sensing signal is sent to the detector 212 for photoelectric conversion to generate a sensing signal to the feedback module 210. The manner that the integrated optics chip 202 is signally connected to the detector 212 can be realized by, for example, a single-mode optical fiber, a multi-mode optical fiber or a micro-lens, and the present disclosure is not limited thereto.

For example, the modulated light source signal is sent to the optical sensors 204 and 206, and there is no change in the detected object (possibly an environment, an item or a movement behavior, etc.), then the optical detection signal should be equivalent to the modulated light source signal. However, when the detection object (possibly an environment, an item or a movement behavior, etc.) changes, the optical detection signal will change, and it is no longer equivalent to the modulated light source signal. In this way, the integrated optics chip 202 can compare the modulated light source signal with the optical detection signal, so as to generate the light sensing signal. The detector 212 may be a photodiode receiver or a photoelectric conversion device of other type, and the present disclosure is not limited thereto.

The feedback module 210 comprises a plurality of logic circuits and hardware circuits, and the logic circuits and the hardware circuits are electrically connected to each other, so as to configure a plurality of modules comprising a schedule hardware register module (not shown) and a computation circuit module (not shown). The schedule hardware register module is used to temporarily store and schedule the sensing signal received by the feedback module 210, wherein the feedback module 210 uses the modulation signal 400 to obtain the half modulation cycle τ as a reference clock for accessing the schedule hardware register module. For example, the feedback module 210 uses a zero-cross detector to obtain the reference clock. The computation circuit module is used to obtain the temporarily stored signal values of the sensing signals in the two adjacent half modulation cycles 2*τ (such as signal values $R_2$ and $R_1$ in FIG. 3) from the schedule hardware register module, and calculate the differential signal value of the two signal values (such as, the signal value $\Delta R_3$ of FIG. 3, wherein $\Delta R_3=R_2-R_1$). After a plurality of differential signal values (for example, the signal values $\Delta R_3$ to $\Delta R_{n+3}$ in FIG. 3) are scheduled by the computation circuit module, a scheduled feedback signal 406 is formed and sent to the integrated optics chip 202 to achieve the functional purpose of the active high-efficiency feedback modulation and demodulation. The manner for calculating the differential signal value and scheduling the differential signal value can be pre-recorded in the schedule hardware register module, such that the computation circuit module performs corresponding processes according to the pre-recorded manner for computing the differential signal value and scheduling the scheduling differential signal value. The manner that the feedback module 210 is signally connected to the detector 212 is realized by wires or other electrical connection manner, and the manner that the feedback module 210 is signally connected to the integrated optics chip 202 is realized by wires or other electrical connection manner.

The feedback module 210 also transmits the sensing signal to the back-end circuit 208, and the back-end circuit 208 comprises a filter and a calibrator. The filter and the calibrator perform a filtering process and a calibration process on the sensing signal to generate an output data representing a sensing result. The output data can be obtained by the local device or the remote device for related applications, such as the control of aerospace vehicles or the control of precision machining equipment, etc., and the present disclosure is not limited thereto. The manner that the feedback module 210 is signally connected to the back-end circuit 208 is realized by wires or other electrical connection manner.

Figure 3:
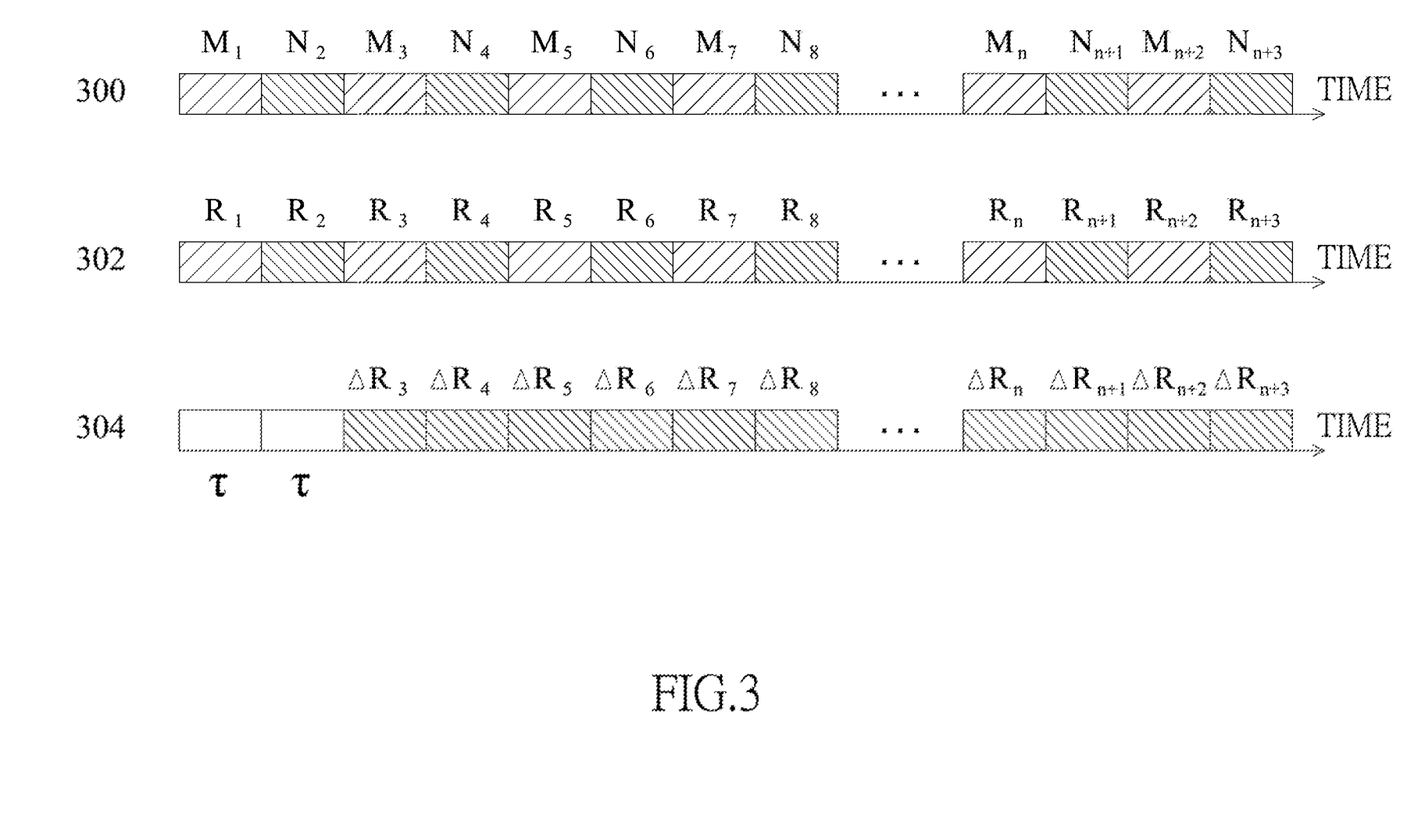
FIG. 3 is a timing diagram of a plurality of signals under a feedback computation process according to an embodiment of the present disclosure.

Refer to FIG. 3, and FIG. 3 is a timing diagram of a plurality of signals under a feedback computation process according to an embodiment of the present disclosure. Being different from the prior art, the solution of the present disclosure mainly introduces the periodic positive and negative modulation signal 300 (corresponding to the above modulation signal 400) which has been scheduled at the signal end, and uses the continuous naming manner in the digital logics to continuously schedule the signal values $M_i$, $N_{i+1}$ (p.s. i is an odd integer larger than 1) in the positive and negative half cycles (i.e., the front and back half modulation cycles 2*τ). For example, the signal values $M_1$, $N_2$, $M_3$, $N_4$, ..., $M_n$, $N_{n+1}$, $M_{n+2}$, $N_{n+3}$ are continuously scheduled. The solution of the present disclosure further utilizes the schedule hardware register module to synchronously temporarily store the signal value $M_i$ or $N_{i+1}$ in the half modulation cycle τ.

A light intensity variation signal 302 (corresponding to the above sensing signal) is resulted from the periodic positive and negative modulation signal 300 which has been scheduled, and signal values $R_k$ (p.s. k is an integer larger than 1) of the light intensity variation signal 302 are continuously scheduled. For example, the signal values $R_1$, $R_2$, $R_3$, $R_4$, ..., $R_n$, $R_{n+1}$, $R_{n+2}$, $R_{n+3}$ are continuously scheduled, and schedule hardware register module is used to synchronously temporarily store the signal values $R_k$ in the half modulation cycle τ. Since the temporarily stored signal values $R_k$ are continuously scheduled and named, the signal value $\Delta R_j$ (p.s. j is larger than or equal to 3) is not needed to be delayed a half modulation cycle T when the computation circuit module computes the signal value $\Delta R_j$ (p.s. j is larger than or equal to 3. $\Delta R_j=N_{j-1}-M_{j-2}$ (if j is an odd integer) or $\Delta R_j=M_{j-1}-N_{j-2}$ (if j is an even integer)) of the continuous demodulation signal 304 (corresponding to the above feedback signal 406) which has been schedule. Thus, the demodulation signal density is twice that of the solution of the prior art. As shown in FIG. 3, except for the continuous demodulation signal 304 which has been schedule does not have signal values (marked as spaces) in the first two half modulation cycles 2*τ, since the solution of the present disclosure overcome the problem that the signal value of the prior art is loss in each cycle, the feedback is located at the phase reset point (such as the cumulative phase is in the range of |−π, +π|), and the sensing point can be continuously locked in the phase optimal linear response region (such as the phase shift position of −π/2 or π/2), and reset the phase modulator of the integrated optics chip within the range of [−π, +π].

In short, compared with the prior art which obtains the signal difference value of the periodic positive and negative modulation signal in the positive and negative half periods after each cycle is elapsed, and accumulates and integrates the signal difference value to feedback in the next cycle, the signal difference value (when j is larger than or equal to 3) of the present disclosure does not need to be delayed by a half modulation cycle t. Thus, more than double the feedback data density can be increased in the offset signal caused by the slow external signal in the prior art can, a lower degree of demodulation offset can be achieved, and it accelerates more than double the offset compensation feedback speed.

Figure 4:
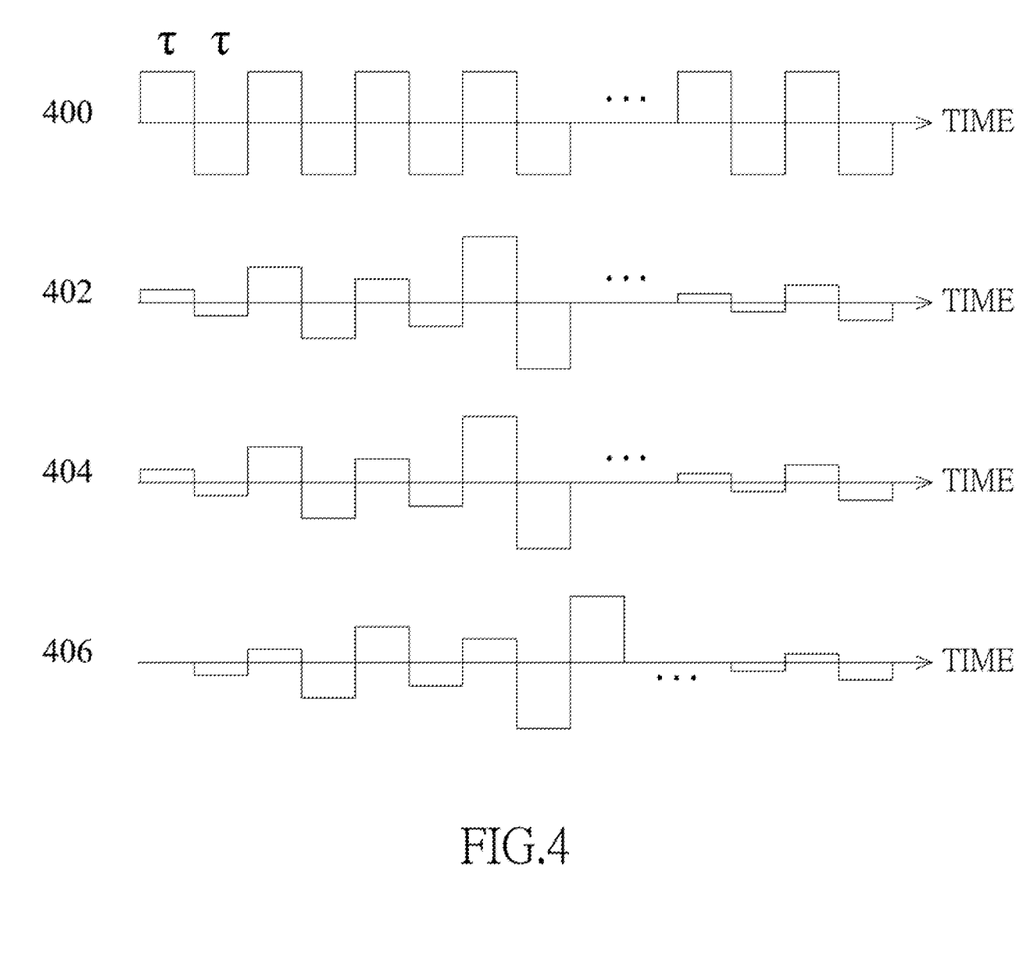
FIG. 4 is another one timing diagram of a plurality of signals under a feedback computation process according to an embodiment of the present disclosure.

Refer to FIG. 2 and FIG. 4 at the same time, and FIG. 4 is another one timing diagram of a plurality of signals under a feedback computation process according to an embodiment of the present disclosure. In FIG. 4, the modulation signal 400 is a continuous positive and negative period modulation signal, and the sensing signal 402 may be different from the modulation signal 400 due to the sensing result. By taking the half modulation cycle t as the time interval, the signal values of the sensing signal 402 is temporarily stored and scheduled in the schedule hardware register module, so as to form the temporarily stored sensing signal 404 which has been scheduled. The feedback module 210 further calculates the differential signal value of the temporarily stored sensing signal 404 in the two adjacent half modulation cycles 2*τ as the signal value of the feedback signal 406, so as to output the feedback signal 406 to the integrated optics chip 202, wherein the continuously calculated the differential signal values of serval two adjacent half modulation cycles 2*τ are also scheduled by computation circuit module and temporarily stored in the schedule hardware register module.

Figure 5A:
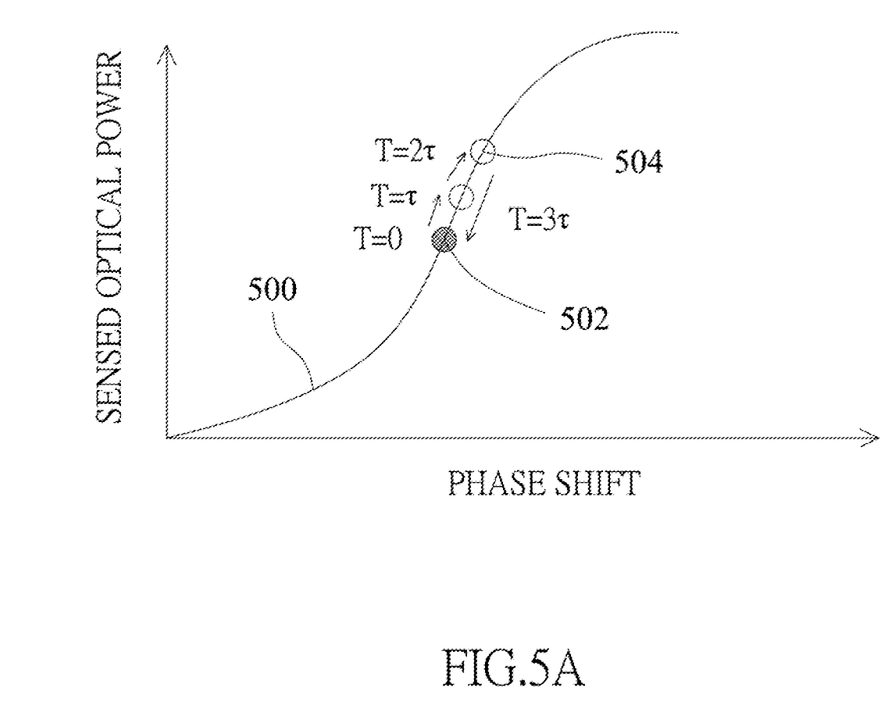
FIG. 5A is a curve plot of phase shift and sensed optical power under the conventional closed-loop signal control process in the prior art.
Figure 5B:
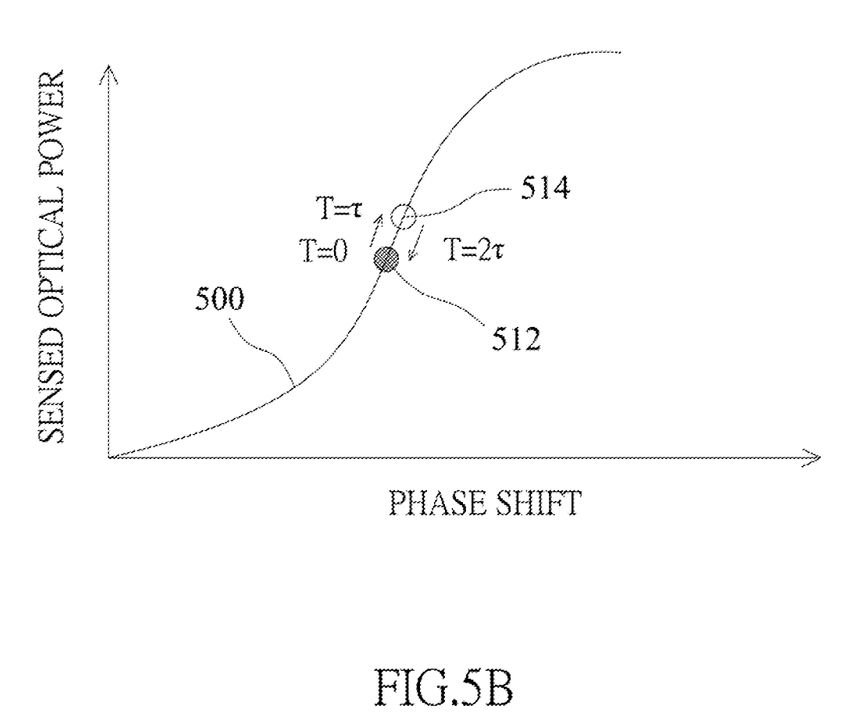
FIG. 5B is a curve plot of phase shift and sensed optical power under a feedback computation process according to an embodiment of the present disclosure.

Refer to FIG. 5A and FIG. 5B at the same time, FIG. 5A is a curve plot of phase shift and sensed optical power under the conventional closed-loop signal control process in the prior art, and FIG. 5B is a curve plot of phase shift and sensed optical power under a feedback computation process according to an embodiment of the present disclosure. In FIG. 5A and FIG. 5B, the horizontal axis represents the value of the phase shift, and the vertical axis represents the value of the sensed optical power of the feedback signal. Assuming that the same phase modulator is used, the relationship between the phase shift of and the sensed optical power of the prior art and the present disclosure can be represented by the curve 500.

Regarding the of the curve 500 in FIG. 5A, the highest precision response position (or the position of the phase-optimal linear operation region) falls on the coordinate point 502, since the prior art requires to accumulate a modulation cycle to have a feedback signal, two half cycles 2*τ have accumulated in time, which equivalently means that it has too long feedback time. Further, the cumulative phase error of the prior art may have shifted to the position of coordinate point 504 of T=2*τ, and the feedback can only be given at T=3*τ. Then, it starts to move the sensing signal point back to the position of the phase-optimal linear operation region (coordinate point 502), so that by actually moving the signal point back to the location of the coordinate point 502, several half modulation cycles x*τ have been elapsed, and during the half modulation cycles x*τ, the system will continue to obtain an error signal and cause phase overflow or phase underflow, thereby resulting in an incorrect phase reset.

Regarding the of the curve 500 in FIG. 5B, the highest precision response position (or the position of the phase-optimal linear operation region) falls on the coordinate point 512 (the coordinate point 512 will the same as the coordinate point 502 if the conditions are the same). Using the solution of the present disclosure, it is possible to achieve that within each modulation cycle (T=2*τ), the shifted coordinate point 514 can be locked back to the position of the coordinate point 512, wherein the coordinate point 512 is the highly efficient operation point. That is, the shift work point of the phase modulator in the integrated optics chip can be locked back to the optimal efficiency work point at around a half modulation cycle r. Due to the continuous scheduled demodulation scheme, the position of the coordinate point 512 is expected to be shifted only to the coordinate point 514 within a half modulation cycle time (T=τ), and since the closed-loop feedback signal of the present disclosure is a continuous feedback signal, which is continuously applied to the phase modulator of the integrated optics chip, the shifted coordinate point 514 will immediately be locked back to the position of the coordinate point 512, so the present disclosure is expected to achieve simultaneous reductions of phase error accumulation and the phase overflow or phase underflow phenomenon generation of the reset point.

To sum up, compared with the prior art, the solution of the prior art achieves the functional purpose of effective phase reset at the correct phase reset operating point by using the solution of the previous of the closed-loop photoelectric sensor of adding a discriminant or an disturbance estimated mount, but the solution of the present disclosure is to add the schedule hardware register module to record the change in light intensity generated by the modulation signal in each half modulation cycle, and by using the recording information of the previous half modulation cycle, the photoelectric sensing signal can be obtained at twice the sampling frequency superior to the prior art, so the data density can be more than doubled. Moreover, since the solution of present disclosure uses a schedule hardware register module, the software is not used in the computing unit, the computational energy consumption of the required field programmable logic gate array (FPGA) chip can be reduced at the same time. Compared with the pure digital logic of the prior art, the computing energy consumption using the solution of the present disclosure is expected to reduce the system computing power by about 17%.

While the present disclosure has been described by way of example and in terms of preferred embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A feedback module used in a photoelectric sensing system comprising logic circuits and hardware circuits, both of which are electrically connected to each other to form a plurality of modules, wherein the modules comprises:
   a schedule hardware register module, configured to receive a modulation signal in the photoelectric sensing system and a sensing signal in the photoelectric sensing system, schedule and temporarily store signal values of the sensing signal in successive half modulation cycles in sequence by taking the half modulation cycle as a time interval to obtain a temporarily stored sensing signal which has been scheduled; and
   a computation circuit module, wherein in each of the half modulation cycles, the computation circuit module calculates a differential signal value of the temporarily stored sensing signal between the previous two half modulation cycles, and outputs the differential signal value as a signal value of a feedback signal;
   wherein the schedule hardware register module is further configured to temporarily store the feedback signal, and the feedback module feedbacks the feedback signal to an integrated optics chip of the photoelectric sensing system.

2. The feedback module of claim 1, wherein a manner for computing the differential signal value and scheduling the differential signal value is pre-recorded in the schedule hardware register module, such that the computation circuit module performs corresponding processes according to the pre-recorded manner for computing the differential signal value and scheduling the scheduling differential signal value.

3. The feedback module of claim 1, wherein the feedback module obtains the half modulation cycle from the modulation signal as a reference clock for accessing the schedule hardware register module.

4. The feedback module of claim 1, wherein the feedback module locks a shift work point of the integrated optics chip to an optimal efficiency work point after the half modulation cycle elapses.

5. A photoelectric sensing system, comprising:
   a feedback module, comprising logic circuits and hardware circuits, both of which are electrically connected to each other to form a plurality of modules, wherein the modules comprises:
     a schedule hardware register module, configured to receive a modulation signal in the photoelectric sensing system and a sensing signal in the photoelectric sensing system, schedule and temporarily store signal values of the sensing signal in successive half modulation cycles in sequence by taking the half modulation cycle as a time interval to obtain a temporarily stored sensing signal which has been scheduled; and
     a computation circuit module, wherein in each of the half modulation cycles, the computation circuit module calculates a differential signal value of the temporarily stored sensing signal between the previous two half modulation cycles, and outputs the differential signal value as a signal value of a feedback signal;
     wherein the schedule hardware register module is further configured to temporarily store the feedback signal, and the feedback module feedbacks the feedback signal to an integrated optics chip of the photoelectric sensing system;
   a light source module, configured to provide a light source signal;
   the integrated optics chip, configured to receive the light source signal and at least one optical detection signal;
   at least one optical sensor, configured to acquire the at least one optical detection signal, wherein the integrated optics chip generates a light sensing signal according to the at least one optical detection signal; and
   a detector, configured to perform a photoelectric conversion on the light sensing signal to generate the sensing signal.

6. The photoelectric sensing system of claim 5, wherein a manner for computing the differential signal value and scheduling the differential signal value is pre-recorded in the schedule hardware register module, such that the computation circuit module performs corresponding processes according to the pre-recorded manner for computing the differential signal value and scheduling the scheduling differential signal value.

7. The photoelectric sensing system of claim 5, wherein the feedback module obtains the half modulation cycle from the modulation signal as a reference clock for accessing the schedule hardware register module.

8. The photoelectric sensing system of claim 5, wherein the feedback module locks a shift work point of the integrated optics chip to an optimal efficiency work point after the half modulation cycle elapses.

9. The photoelectric sensing system of claim 5, further comprising:
   a back-end circuit, configured to receive the sensing signal, and to perform a filtering process and a calibration process on the sensing signal to generate an output data representing a sensing result.

10. The photoelectric sensing system of claim 5, wherein the feedback module is further configured to adjust a light source signal intensity, and the integrated optics chip is triggered by the light source signal.

11. The photoelectric sensing system of claim 5, wherein the at least one optical sensor comprises two optical sensors, and the at least one optical detection signal comprises two optical detection signals.

12. The photoelectric sensing system of claim 5, wherein the integrated optics chip comprises a phase modulator which is configured to modulate the light source signal according to the modulation signal to generate a modulated light source signal, wherein the integrated optics chip generates the light sensing signal according to the at least one optical detection signal and the modulated light source signal.

13. The photoelectric sensing system of claim 12, wherein the integrated optics chip resets the phase modulator according to the feedback signal.

* * * * *